United States Patent
Fife (10) Patent No.: US 10,144,358 B2
(45) Date of Patent: Dec. 4, 2018

(54) MODULAR RACK SYSTEM

(71) Applicant: Gunner Fab, LLC, Kerrville, TX (US)

(72) Inventor: Rob Fife, Mountain Home, TX (US)

(73) Assignee: Gunner Fab, LLC, Kerrville, TX (US)

( * ) Notice: Subject to any disclaimer, the term of this patent is extended or adjusted under 35 U.S.C. 154(b) by 0 days.

(21) Appl. No.: 15/262,394

(22) Filed: Sep. 12, 2016

(65) Prior Publication Data

US 2017/0072864 A1   Mar. 16, 2017

Related U.S. Application Data (60) Provisional application No. 62/216,702, filed on Sep. 10, 2015.

(51) Int. Cl.
   A47F 7/00      (2006.01)
   B60R 7/14      (2006.01)
   A47B 81/00     (2006.01)
   A47F 5/08      (2006.01)

(52) U.S. Cl.
   CPC .............. *B60R 7/14* (2013.01); *A47B 81/005* (2013.01); *A47F 5/08* (2013.01)

(58) Field of Classification Search
   CPC ......... B60R 7/14; A47B 81/005; A47B 81/00; A47F 7/021; A47F 7/0028; A47F 7/0021; A47F 5/08; A47F 7/00; F14C 33/007; F41A 23/005; F41A 23/26; F41A 23/16
   USPC ...... 211/64, 85.7, 87.01, 175, 183; 224/913; 42/94; 206/317
   See application file for complete search history.

(56) References Cited

U.S. PATENT DOCUMENTS

| | | | | | |
|---|---|---|---|---|---|
| 2,783,896 | A | * | 3/1957 | Agostini | B60R 7/14 211/64 |
| 3,031,069 | A | * | 4/1962 | Hirsch | F41C 33/06 206/317 |
| 3,584,820 | A | * | 6/1971 | Butcher, Sr. | F41B 5/14 124/25.7 |
| 3,876,078 | A | * | 4/1975 | Gomes | A47B 81/005 211/64 |
| 3,917,071 | A | * | 11/1975 | Walters | A47B 81/005 211/4 |
| 4,132,315 | A | * | 1/1979 | Young | E05B 73/00 211/4 |
| 4,936,531 | A | * | 6/1990 | Bauser | B60N 3/00 211/64 |
| 5,495,969 | A | * | 3/1996 | Cardenas | B60R 7/14 211/195 |
| 5,595,333 | A | * | 1/1997 | Boston | B60R 7/14 211/60.1 |
| 5,626,379 | A | * | 5/1997 | Scott | A47B 81/005 211/195 |
| 5,680,939 | A | * | 10/1997 | Oliver | F41A 23/18 211/64 |
| 5,697,181 | A | * | 12/1997 | Savant | F41A 23/06 211/64 |
| D401,213 | S | * | 11/1998 | Inchaurregui | D12/406 |

(Continued)

*Primary Examiner* — Jennifer E. Novosad
(74) *Attorney, Agent, or Firm* — Gunn, Lee & Cave, PC (57) ABSTRACT

A modular rack system having a spine having a top end, a bottom end, a front surface, and a back surface; a hanger mounted to the spine, the hanger having at least partially cylindrical side surface; and a foot mounted to the spine longitudinally between the hanger and the bottom end, the foot having a foot volume.

20 Claims, 10 Drawing Sheets

(56) References Cited

U.S. PATENT DOCUMENTS

| | | | | |
|---|---|---|---|---|
| 5,979,846 A * | 11/1999 | Fluhr | ............... | B60R 7/14 211/64 |
| 6,129,252 A * | 10/2000 | Jackson | ............... | B60R 7/14 114/351 |
| 6,438,885 B1 * | 8/2002 | Murray | ............... | F41A 17/54 211/64 |
| 6,935,065 B1 * | 8/2005 | Oliver | ............... | F41A 23/04 211/64 |
| 7,137,511 B1 * | 11/2006 | Crowell | ............... | F41A 23/18 211/4 |
| D611,558 S * | 3/2010 | Freeman | ............... | D22/108 |
| 7,770,740 B2 * | 8/2010 | Punzel | ............... | A47B 81/005 211/64 |
| 8,678,206 B2 * | 3/2014 | Kubiniec | ............... | A47B 81/005 211/64 |
| 8,910,560 B2 * | 12/2014 | Irwin | ............... | F41A 23/005 211/4 |
| 2003/0150972 A1 * | 8/2003 | Murray | ............... | B60R 7/14 248/682 |
| 2005/0145585 A1 * | 7/2005 | Pintar | ............... | A47F 7/0028 211/64 |
| 2007/0170129 A1 * | 7/2007 | Punzel | ............... | A47B 81/005 211/64 |
| 2011/0168649 A1 * | 7/2011 | Stolz | ............... | A47B 81/005 211/4 |
| 2014/0263107 A1 * | 9/2014 | Arabian | ............... | B60R 7/14 211/8 |
| 2014/0312087 A1 * | 10/2014 | Malingen | ............... | B60R 7/14 224/539 |
| 2015/0069103 A1 * | 3/2015 | Fife | ............... | B60R 7/14 224/555 |
| 2016/0238337 A1 * | 8/2016 | Hull | ............... | B60R 7/14 |
| 2017/0072864 A1 * | 3/2017 | Fife | ............... | A47B 81/005 |

\* cited by examiner

MODULAR RACK SYSTEM

CROSS REFERENCES TO RELATED APPLICATIONS

This continuation application claims priority to and the benefit of U.S. provisional application Ser. No. 62/216,702, filed Sep. 10, 2015, which is incorporated by reference.

FEDERALLY SPONSORED RESEARCH

Not applicable.

BACKGROUND OF THE INVENTION

1. Field of the Invention

This invention relates generally to storage and handling. More specifically, the invention is a modular rack assembly for transporting firearms and accessories in a vehicle.

2. Description of the Related Art

Gun storage and transportation can present particular problems—namely, efficient use of space and safety. When travelling with a large hunting or shooting group in one vehicle, for example, available storage space can be quickly consumed by gun cases, equipment, and the like. Moreover, with more people and firearms, the potential for accidentally discharge can increase as more guns are being manipulated. While there are storage and transport solutions specific to cars, for the most part these solutions to make efficient use of space and store the gun in a vertical position.

BRIEF SUMMARY

The invention is a modular rack assembly that is space efficient, provides for storage of equipment in addition to long guns, and stores long guns in an vertical position against the back of a seat. The invention comprises a spine having a top end, a bottom end, a front surface, and a back surface; a hanger mounted to the spine, the hanger having at least partially cylindrical side surface; and a foot mounted to the spine longitudinally between the hanger and the bottom end, the foot having a foot volume.

DETAILED DESCRIPTION OF CERTAIN EMBODIMENTS

Figure 1:
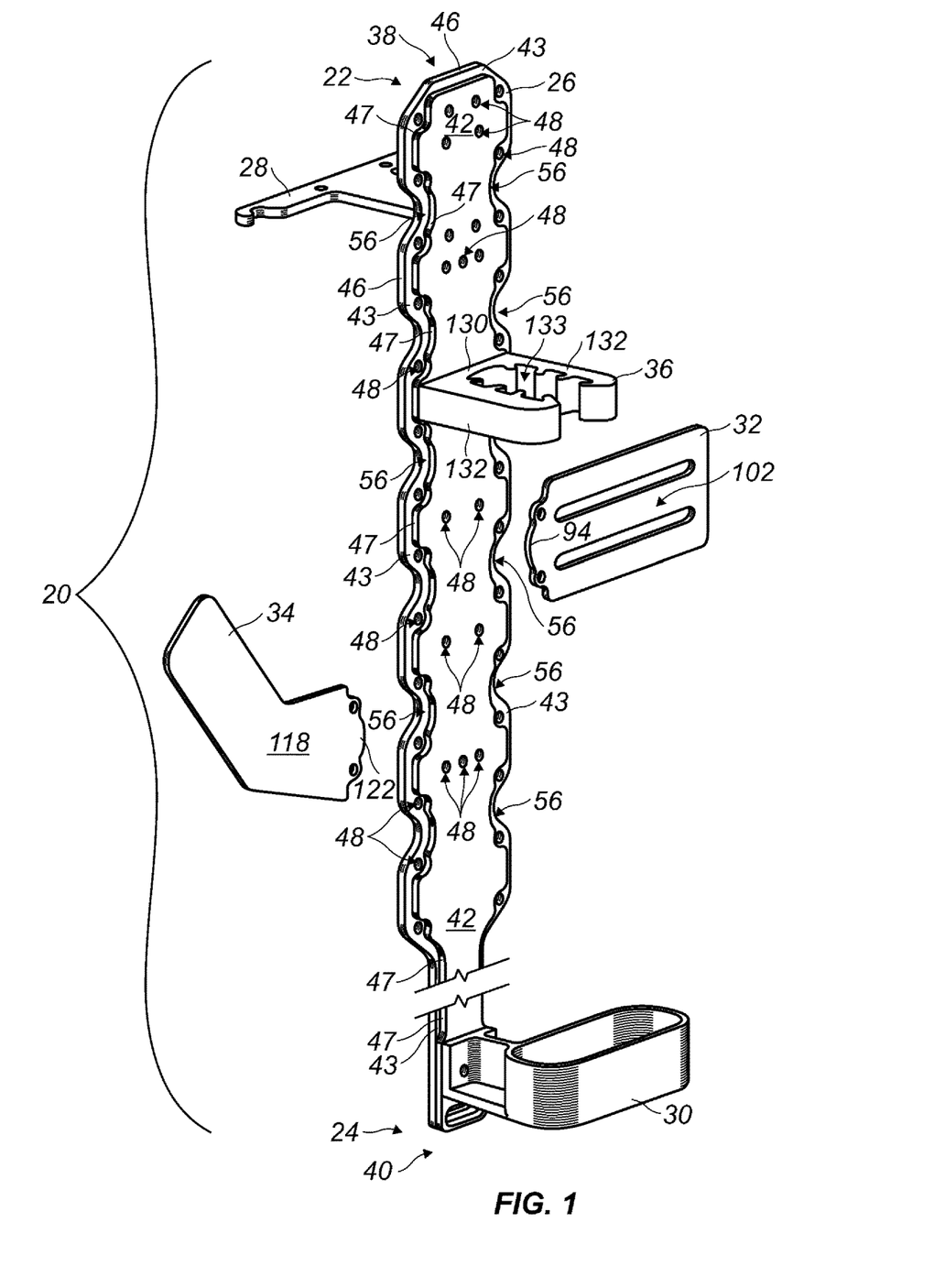
FIG. 1 shows an embodiment of the invention.

FIG. 1 shows an embodiment 20 of the invention, which embodiment 20 includes a top end 22 and a bottom end 24. The embodiment 20 also includes a spine 26, a hanger 28, a foot 30, a first side panel 32, a second side panel 34, and a holding bracket 36.

Figure 2:
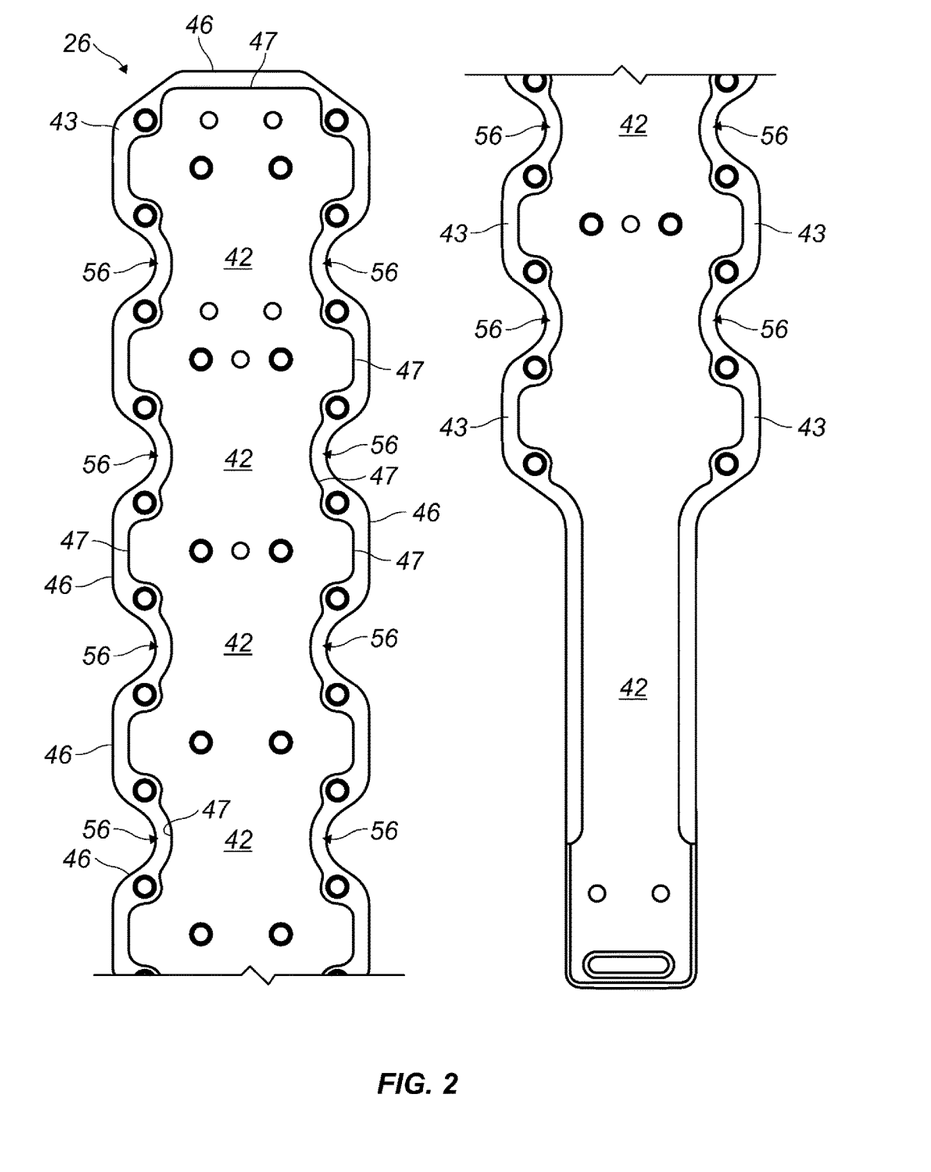
FIG. 2 is a front view of the spine of the embodiment shown in FIG. 1.
Figure 3:
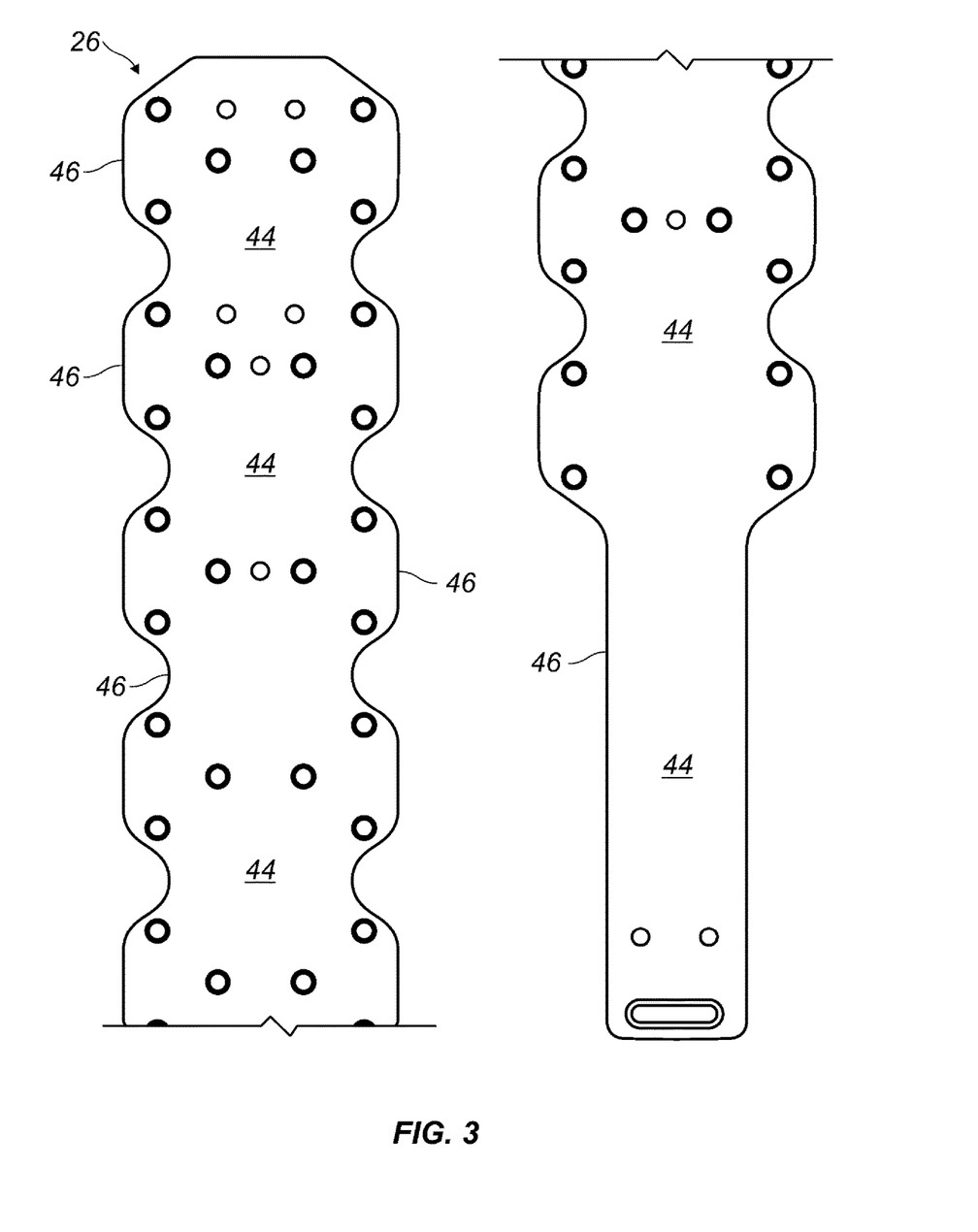
FIG. 3 is a rear view of the spine.

In this embodiment, the spine 26 is an elongate aluminum body having a first end 38 coterminal with the top end 22 of the embodiment 20 and a second end 40 coterminal with the bottom end 24 of the embodiment 20. The spine 26 further has a planar front surface 42, a planar outer intermediate surface 43, and a planar back surface 44. The front surface 42, outer intermediate surface 43, and back surface 44 are parallel to one another.

A first side surface 46 is adjacent and perpendicular to the back surface 44 and the intermediate surface 43. A second side surface 47 is adjacent and perpendicular to the intermediate surface 43 and the front surface 42. The first side surface 46 defines the outer boundary of the spine 26 and its width.

The spine 26 is planar in the sense that its maximum front-to-back thickness (i.e., the maximum distance between the front surface 42 and back surface 44) is substantially less than its top-to-bottom length and its maximum width. Bolt holes 48 defined by cylindrical surfaces extend through the spine 26 between the front surface 42 and the back surface 44 as well as between the front surface 42 and intermediate surface 43.

The second side surface 47 includes a plurality of curved sections that define a number of rounded volumes 56 along the length of the spine 26. Each rounded volume 56 is adjacent to part of the intermediate surface 43.

Figure 4:
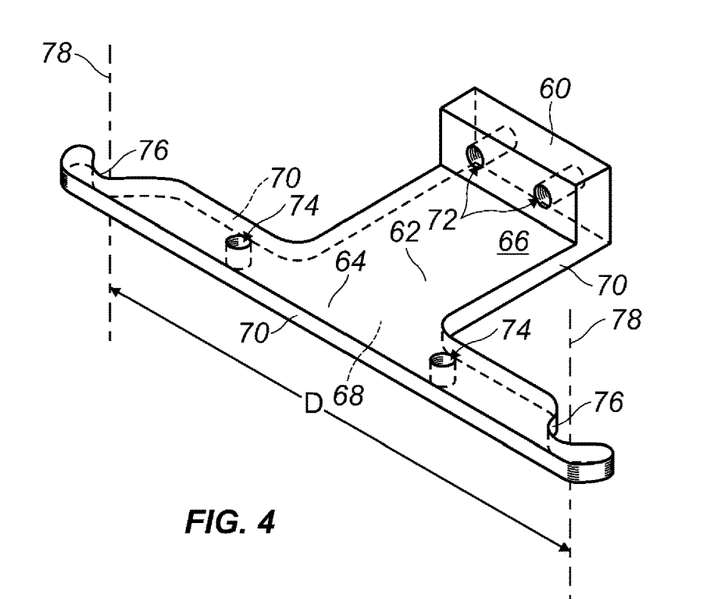
FIG. 4 is an isometric view of the hanger shown in FIG. 1.

Referring to FIG. 4, the hanger 28 is generally T-shaped with a base 60, a stem 62 connected to the base 60, and a bar 64 connected and generally perpendicular to the stem 62. The stem 62 and bar 64 have top and bottom surfaces 66, 68 separated by side surfaces 70. A first pair of bolt holes 72 extends through the base 60. A second pair of bolt holes 74 extends through the bar 64 between the top and bottom surfaces 66, 68. The side surface 70 includes two partially-cylindrical surfaces 76 around axes 78. The axes are spaced apart a distance D, which is wider than the maximum width of the spine 26 (see FIG. 1) and correspond D to the distance between the posts of a twin-post headrest (as will be described with reference to FIG. 9).

Referring back to FIG. 1, the hanger 28 is mounted to the back surface 44 of the spine 26 with bolts. The hanger 28 extends perpendicularly away from the spine 26.

Figure 5:
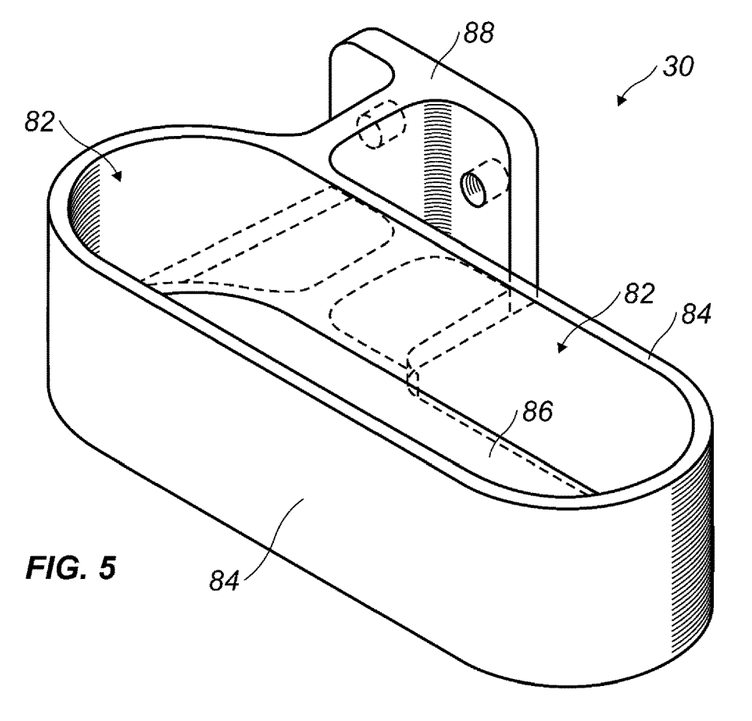
FIG. 5 is an isometric view of the foot shown in FIG. 1.

Referring to FIG. 5, the foot 30 defines a foot volume 82 for receiving, for example, the stock of a long gun. The foot volume 82 is defined by a wall 84 and a planar bottom 86. The foot 30 includes a mounting bracket 88 attached to the wall 84.

Referring back to FIG. 1, the foot 30 is connected to the spine 26 proximal to the bottom end 24. The mounting bracket 88 is in contact with the front surface 42 of the spine 26.

Figure 6:
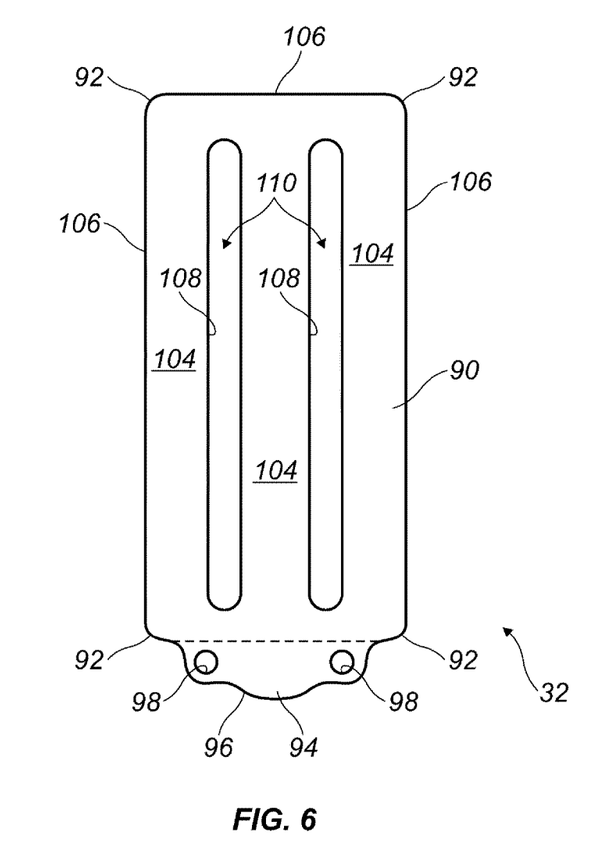
FIG. 6 is a rear view of the first side mount.

Referring to FIG. 6, the first side mount 32 has a rectangular body 90 with rounded corners 92 and a tab 94 extending from one side of the body 90. The tab 94 includes convex partially cylindrical surface 96 that corresponds in size and curvature to the shape of the volumes 56 (see FIGS. 1-3). Cylindrical surfaces 98 define mounting holes spaced a first distance from one another. The body 90 has a planar front surface 102 (see FIG. 1) and a planar back surface 104 separated by side surfaces 106, 108. The side surfaces 108 define elongate slots 110 that may be used, for example, for looping straps. The first side mount 32 has a uniform thickness that is less than the maximum thickness of the spine 26.

Referring back to FIG. 1, the first side mount 32 can be bolted to either side of the spine 26. The tab 94 occupies one of the volumes 56. The front surface 102 is coplanar with the front surface 52 of the spine 26.

Figure 7:
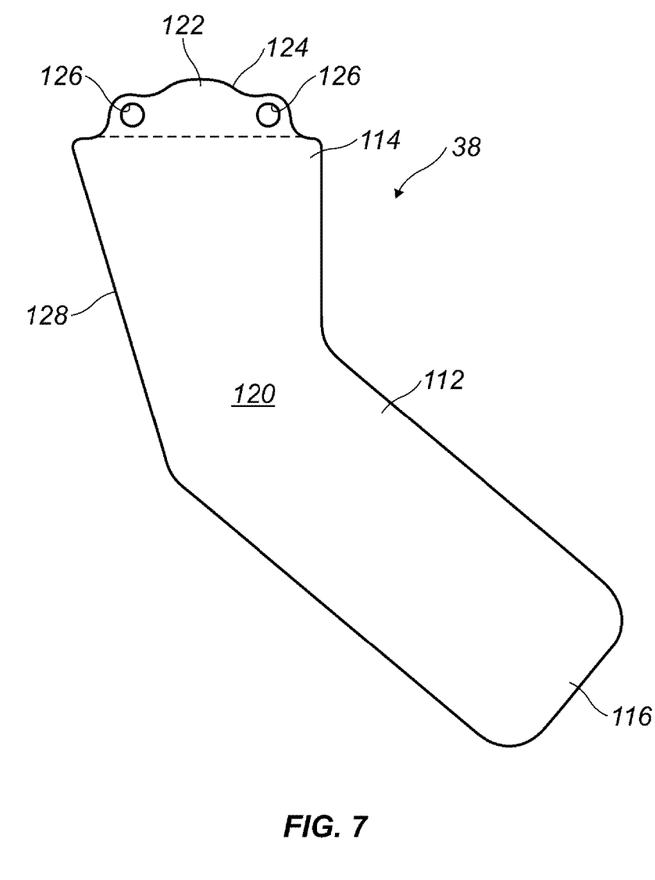
FIG. 7 is a rear view of the second side mount.

Referring to FIG. 7, the second side mount 38 has a body 112 with a first end 114, a second end 116, a front surface 118 (see FIG. 1), and a back surface 120 that is parallel to the front surface 118. A tab 122 extends from the first end 114 of the body 112. The tab 122 includes convex partially cylindrical surface 124. The tab 122 is identical to the tab 94 of the first side mount 32. Cylindrical surfaces 126 define mounting holes spaced the first distance from one another. The second side mount 38 has a uniform thickness that is less than the maximum thickness of the spine 26. The front and back surfaces 118, 120 are separated by side surfaces 128.

Referring back to FIG. 1, the second side mount 38 can be bolted to either side of the spine 26. The tab 122 occupies one of the volumes 56. The front surface 118 is coplanar with the front surface 52 of the spine 26.

Still referring to FIG. 1, the bracket 36 is mounted to the spine 26 above the mounting positions of the side mounts 32, 38 and below the mounting position of the hanger 28. The bracket 36 is generally U-shaped with a base 130 and two fingers 132 that extend from the base 130 away from the spine 26. The bracket 36 defines an opening into the bracketed volume 133. A strap (not shown) may be attached to the bracket 36 to allow the bracketed volume 133 to be closed off.

Figure 8:
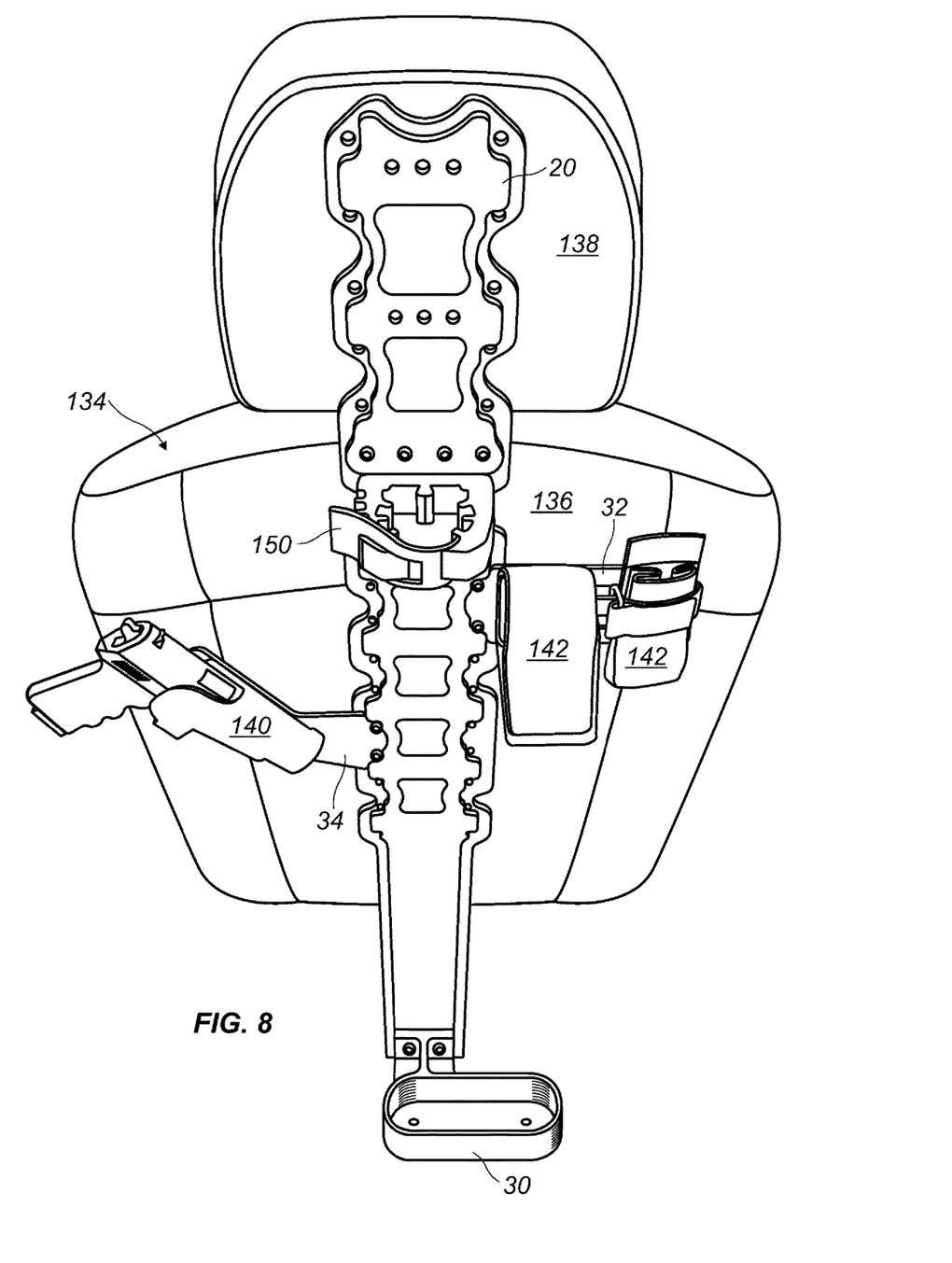
FIGS. 8-10 show the embodiment in use in a vehicle.

FIG. 8 shows the embodiment described with reference to FIGS. 1-3 in use with a car seat having a seat back 136 and two-post headrest 138. The embodiment 20 is secured to the seat 134 of a vehicle with the foot 130 proximal to the floor of the car. The back surface 44 (not shown) of the embodiment 20 contacts the seat back 136 and headrest 138. A pistol holster 140 is strapped to the second side mount 34. Two bags 142 are strapped to the first side mount 32.

Figure 9:
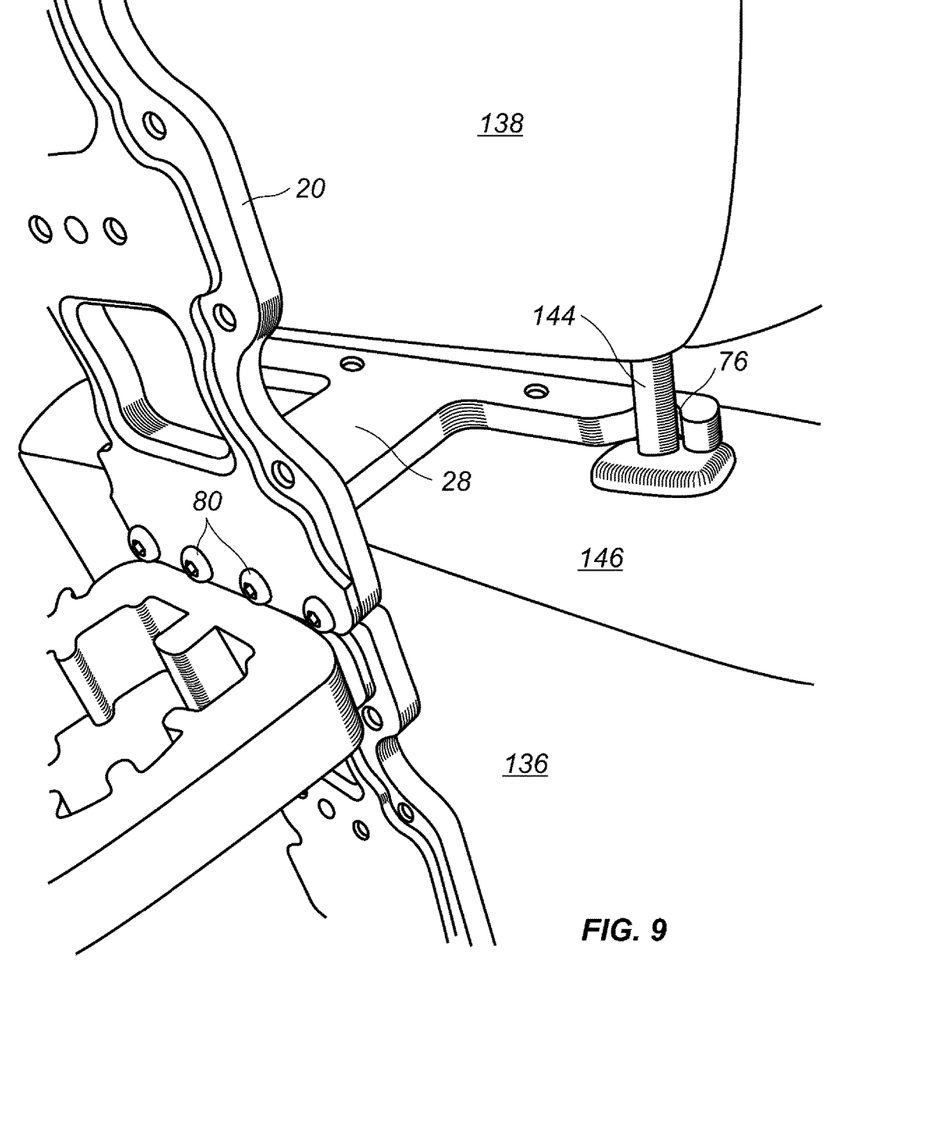

Referring to FIG. 9, the hanger 28 is in contact with the posts 144 of the headrest 138 and a top surface 146 of the seatback 136. The surfaces 76 are in contact with the posts 144. The weight of the embodiment 20 and its load (if any) holds the hanger 28 in this position. The hanger is connected to the spine with bolts 80.

Figure 10:
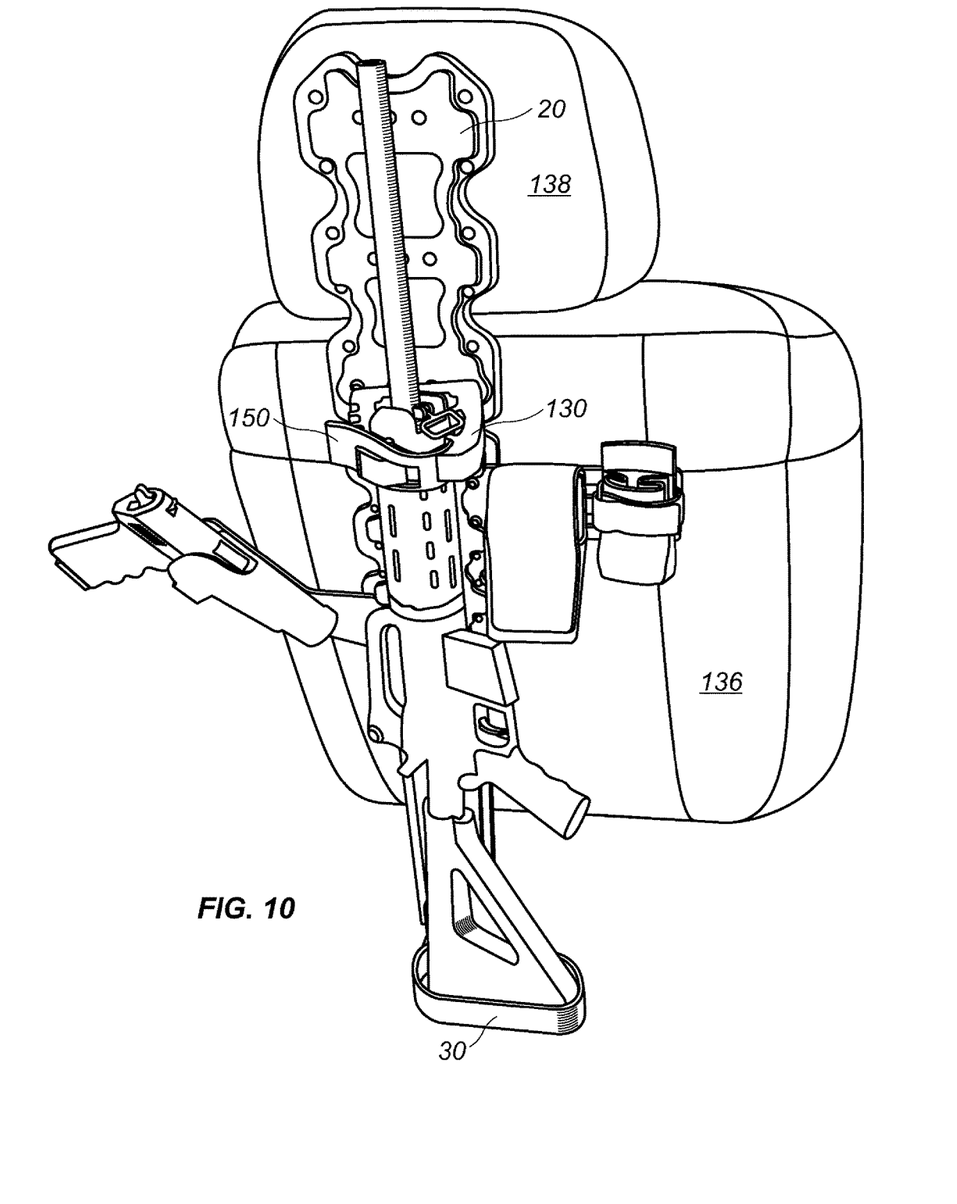

Referring to FIG. 10, a long gun is secured to the embodiment 20. The long gun has a stock end that is positioned in the foot 30. The receiver is positioned in the bracket 130 and secured with a strap 150. The embodiment 20 allows the long gun to be stored in a vertical orientation during transport, which is both more space-efficient and safer for the occupants of the vehicle.

Figure 11:
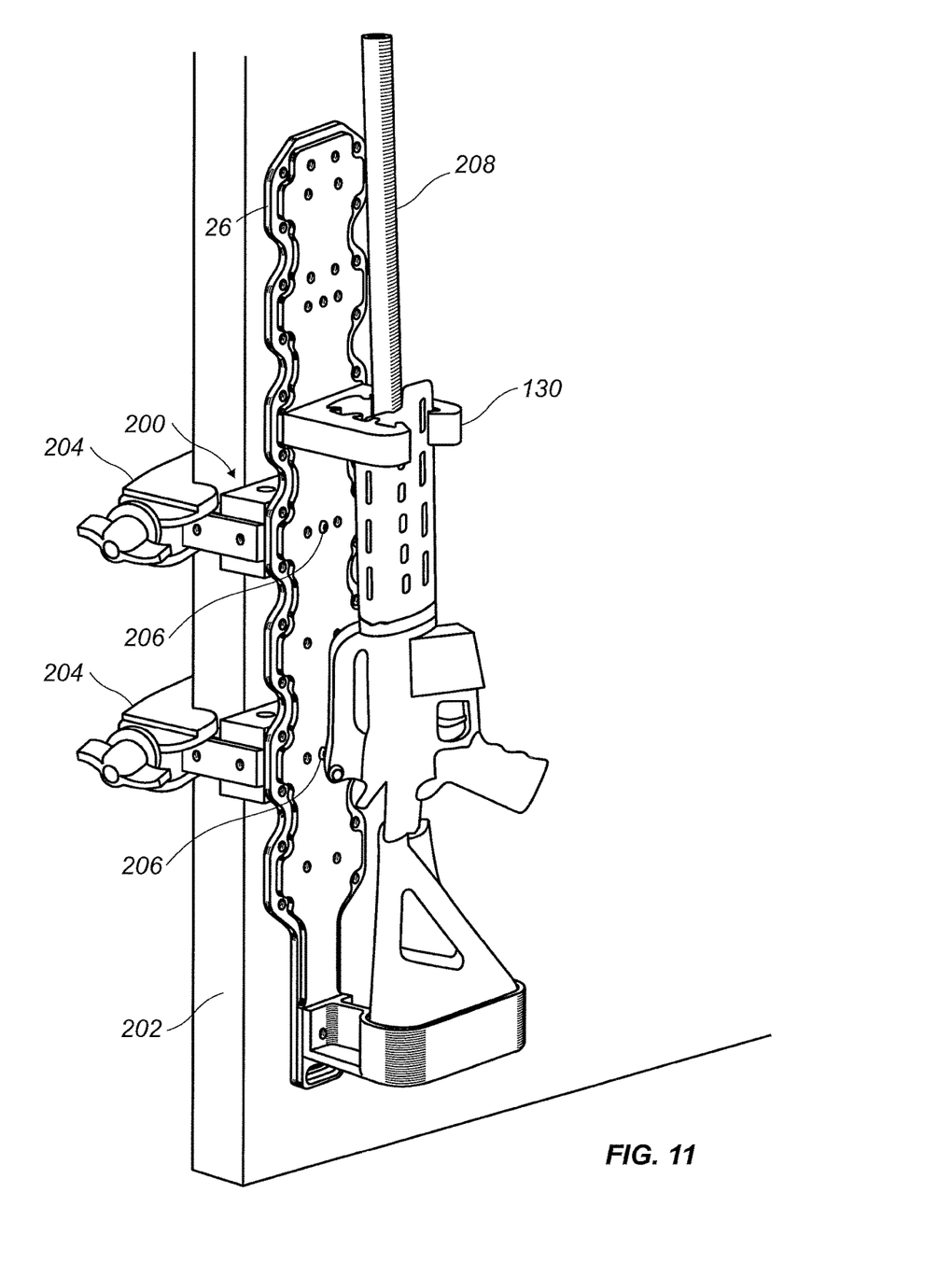
FIG. 11 shows a second embodiment installed on a door.

Referring to FIG. 11, a second embodiment 200 of the invention is attached to a door 202. Identical clamps 204 are attached to the spine 26 with bolts 206. A long gun 208 is positioned in the foot (not shown, but as described with reference to FIGS. 8-10) and the long gun 208 is not strapped to the embodiment 200, so it can be quickly removed for use.

Figure 12:
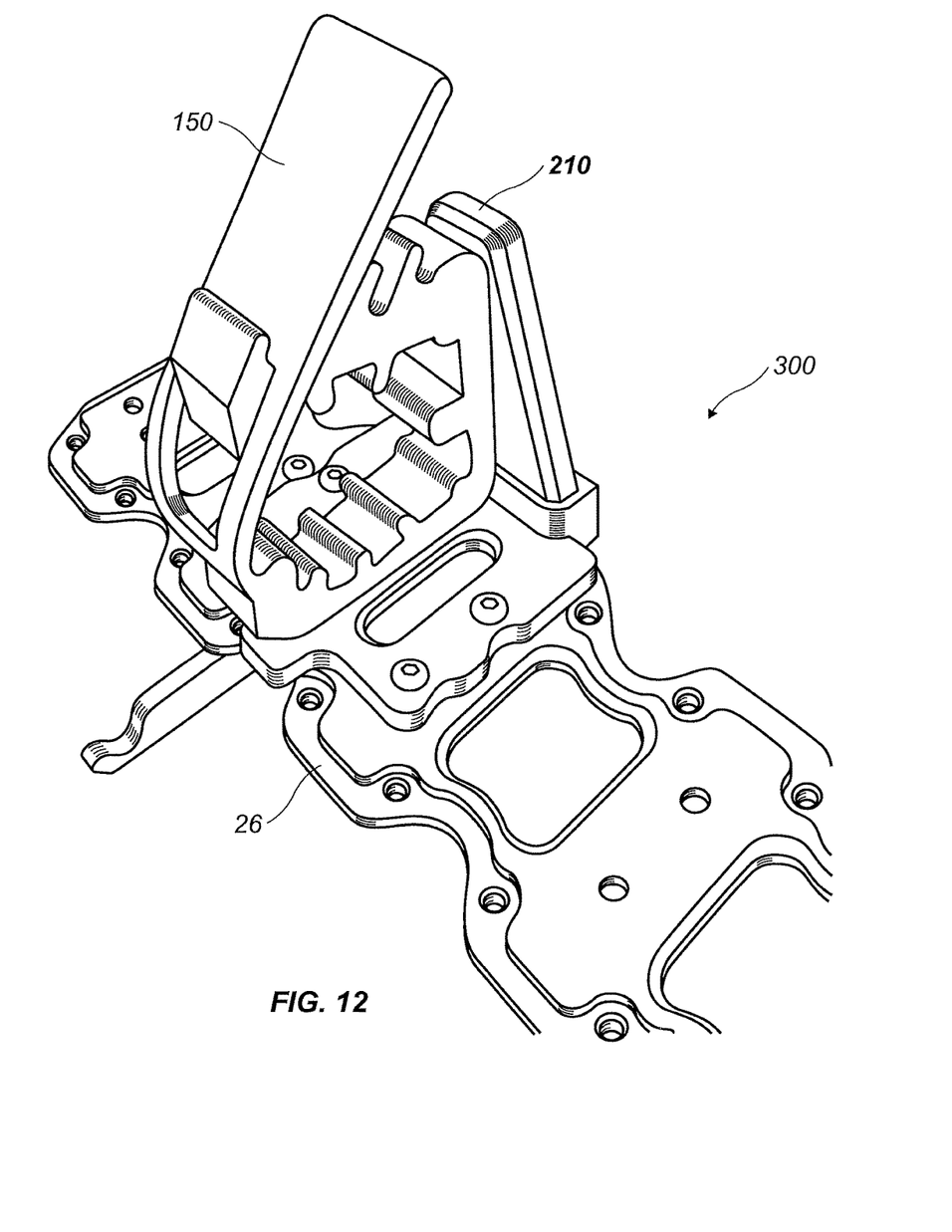
FIG. 12 shows a third embodiment configured for horizontal mounting.

Referring to FIG. 12, a third embodiment 300 includes a support 210 and the strap 150 referenced with respect to FIG. 10 The support 210 is a generally trapezoidal plate with an end distal from the spine 26. The support 210 is perpendicularly attached to the spine 26. This embodiment 300 supports a gun in a horizontal configuration.

The present invention is described in terms of specifically-described embodiments. Those skilled in the art will recognize that other embodiments of such device can be used in carrying out the present invention. Other aspects and advantages of the present invention may be obtained from a study of this disclosure and the drawings, along with the appended claims.

I claim:

1. A modular rack system for holding firearms and accessories comprising:
   a spine having a top end, a bottom end, a front surface, a back surface, a spine length, a spine width, a front-to-back thickness, an outer intermediate surface, a first side surface adjacent to the back surface and the outer intermediate surface, and a second side surface adjacent to the outer intermediate surface and the front surface, wherein the first side surface defines an outer boundary of the spine and the spine width, and wherein the second side surface defines a plurality of rounded volumes along at least part of the spine length, and each rounded volume is adjacent to part of the outer intermediate surface;
   a bracket mounted to the front surface, the bracket having a base and two fingers that extend from the base away from the spine and define a bracketed volume for holding at least one firearm; and
   a foot mounted to the spine longitudinally between the bracket and the bottom end, the foot having a wall defining a foot volume for receiving the stock of the at least one firearm.

2. The modular rack system of claim 1 wherein the front surface, the back surface, and the outer intermediate surface are parallel planar surfaces and the first side surface and second side surface are perpendicular to the outer intermediate surface.

3. The modular rack system of claim 1 further comprising a side mount having a body with an end, and a tab extending from the end, the tab corresponding in size and curvature to the rounded volumes.

4. The modular rack system of claim 3 wherein the side mount further comprises a front surface that is coplanar with the front surface of the spine.

5. The modular rack system of claim 1 further comprising a hanger mounted to the spine, the hanger having at least two partially cylindrical side surfaces spaced apart a distance greater than the spine width.

6. The modular rack system of claim 5 wherein the hanger has a base, a stem connected to the base, and a bar connected to the stem.

7. The modular rack system of claim 1 further comprising a clamp attached to the back surface of the spine.

8. The modular rack system of claim 1 wherein the outer intermediate surface is perpendicular to the second side surface.

9. The modular rack system of claim 1 wherein at least one of the two fingers is a strap.

10. A modular rack system for holding firearms and accessories comprising:
    a spine having a top end, a bottom end, a front surface, a back surface, a spine length, a spine width, a front-to-back thickness, an outer intermediate surface, a first side surface adjacent to the back surface and the outer intermediate surface, and a second side surface adjacent to the outer intermediate surface and the front surface, wherein the first side surface defines an outer boundary of the spine and the spine width, and wherein the second side surface defines a plurality of rounded volumes along at least part of the spine length, and each rounded volume is adjacent to part of the outer intermediate surface;

a bracket mounted to the front surface, the bracket having at least two fingers that define a bracketed volume for holding at least one firearm; and a foot mounted to the spine longitudinally between the bracket and the bottom end, the foot having a wall defining a foot volume for receiving the stock of the at least one firearm.

11. The modular rack system of claim 10 wherein the front surface, the back surface, and the outer intermediate surface are parallel planar surfaces and the first side surface and second side surface are perpendicular to the outer intermediate surface.

12. The modular rack system of claim 10 wherein the outer intermediate surface is perpendicular to the second side surface.

13. The modular rack system of claim 10 wherein at least one of the two fingers is a strap.

14. A modular rack system for holding firearms and accessories comprising:

a spine having a top end, a bottom end, a front surface, a back surface, a spine length, a spine width, a front-to-back thickness, an outer intermediate surface, a first side surface adjacent to the back surface and the outer intermediate surface and the front surface, and a second side surface adjacent to the outer intermediate surface, wherein the first side surface defines an outer boundary of the spine and the spine width, and wherein the second side surface defines a plurality of similarly-shaped volumes along at least part of the spine length, and each similarly-shaped volume is adjacent to part of the outer intermediate surface;

a bracket mounted to the front surface, the bracket having at least two fingers that define a bracketed volume for holding at least one firearm; and a foot mounted to the spine longitudinally between the bracket and the bottom end, the foot having a wall defining a foot volume for receiving the stock of the at least one firearm.

15. The modular rack system of claim 14 further comprising a side mount having a body with an end, and a tab extending from the end, the tab corresponding in size and shape to the similarly-shaped volumes.

16. The modular rack system of claim 14 wherein the similarly-shaped volumes are rounded volumes.

17. The modular rack system of claim 14 wherein the front surface, the back surface, and the outer intermediate surface are parallel planar surfaces and the first side surface and second side surface are perpendicular to the outer intermediate surface.

18. The modular rack system of claim 14 wherein the outer intermediate surface is perpendicular to the second side surface.

19. The modular rack system of claim 14 wherein at least one of the two fingers is a strap.

20. A modular rack system for holding firearms and accessories comprising:

a spine having a top end, a bottom end, a front surface, a back surface, a spine length, a spine width, a front-to-back thickness, an outer intermediate surface, a first side surface adjacent to the back surface and the outer intermediate surface, and a second side surface adjacent to the outer intermediate surface and the front surface, wherein the first side surface defines an outer boundary of the spine and the spine width, the outer intermediate surface defines at least two mounting holes spaced a first distance apart from each other, and the second side surface defines a plurality of shaped volumes;

a bracket mounted to the front surface, the bracket having at least two fingers that define a bracketed volume for holding at least one firearm;

a foot mounted to the spine longitudinally between the bracket and the bottom end, the foot having a wall defining a foot volume for receiving the stock of the at least one firearm; and a side mount having a body, the body having a tab that fits on the outer intermediate surface, the tab having at least two mounting holes spaced the first distance apart from each other.

* * * * *